United States Patent [19]

Umeda

[11] Patent Number: 4,580,831
[45] Date of Patent: Apr. 8, 1986

[54] AUTOMOBILE REAR BODY STRUCTURE

[75] Inventor: Takashi Umeda, Hiroshima, Japan

[73] Assignee: Mazda Motor Corporation, Hiroshima, Japan

[21] Appl. No.: 578,287

[22] Filed: Feb. 8, 1984

[30] Foreign Application Priority Data

Feb. 22, 1983 [JP] Japan .................................. 58-30037
Feb. 24, 1983 [JP] Japan ............................. 58-26709[U]

[51] Int. Cl.[4] ..................... B62D 25/08; B62D 25/10; B62D 43/08; B60J 5/10
[52] U.S. Cl. .................................. 296/195; 296/37.2; 296/203; 296/106
[58] Field of Search ................ 296/37.2, 76, 187, 188, 296/195, 201, 202, 203, 204, 146, 106; 49/394; 292/DIG. 43

[56] References Cited

U.S. PATENT DOCUMENTS

| | | | |
|---|---|---|---|
| 1,741,346 | 12/1929 | Spencer | 296/37.2 |
| 2,488,481 | 11/1949 | Stephenson et al. | 296/37.2 |
| 2,634,149 | 4/1953 | Wise | 292/DIG. 43 |
| 2,806,727 | 9/1957 | Johnstone | 292/DIG. 43 |
| 4,080,812 | 3/1978 | Knott | 292/DIG. 43 |
| 4,273,368 | 6/1981 | Tanaka | 292/DIG. 43 |
| 4,436,336 | 3/1984 | Shimizu | 296/76 |

FOREIGN PATENT DOCUMENTS 118224 9/1978 Japan .
164833 10/1982 Japan .................................. 296/195

OTHER PUBLICATIONS

Auto Car, p. A18, 12/13/35.

Primary Examiner—Robert B. Reeves
Assistant Examiner—Dennis H. Pedder
Attorney, Agent, or Firm—Burns, Doane, Swecker and Mathis

[57] ABSTRACT

An automobile rear body structure which comprises a hingedly supported rear door adapted to selectively close and open an access opening leading to a rear luggage compartment, a rear end panel partly defining the luggage compartment and extending widthwise of the body structure and a recess formed in the rear end of the floor panel at a location substantially intermediately of the width of the body structure for accommodating a wheel and tire in upright position. The rear end panel has a lower edge portion extending from a rear end of the floor panel in a direction generally perpendicular to the floor panel, and an upper edge portion bent so as to protrude in a direction towards the rear door while defining a rear lip region of the access opening. The frontwardly protruding upper edge portion of the rear end panel overhangs the wheel and tire located in the recess.

3 Claims, 7 Drawing Figures

AUTOMOBILE REAR BODY STRUCTURE

BACKGROUND OF THE INVENTION

The present invention generally relates to an automobile body structure and, more particularly, to an automobile rear body structure.

As one of the methods for accommodating a spare wheel and tire in a luggage compartment at the rear of the automobile body structure, the Japanese Laid-open Utility Model Publication No. 53-118224, laid open to public inspection on Sept. 20, 1978, discloses the storage of the spare wheel and tire in an upright position at the front part of the luggage compartment with respect to the direction of forward run of the vehicle, that is, with respect to the direction towards the front of the automobile body structure. The layout of the luggage compartment disclosed in the above mentioned publication has been found disadvantageous in that the stored tire cannot readily be removed from the luggage compartment when the necessity arises. This is particularly true of the body structure for a sports car.

SUMMARY OF THE INVENTION

Accordingly, the present invention has been developed with a view to substantially eliminating the above described disadvantage inherent in the prior art automobile rear body structure, and has for its essential object to provide an improved automobile rear body structure that permits a substantially smooth and ready removal and placement of a wheel and mounted tire from and into the luggage compartment.

Another object of the present invention is to provide an improved automobile rear body structure which is so designed as to increase the rigidity of a rear end panel.

According to the present invention, the above described objects can be accomplished by defining a space for the storage of the wheel and tire at a location corresponding to the rearmost part of the luggage compartment. More specifically, the rear body structure according to the present invention has a luggage compartment, a rear lip region which is defined by a frontwardly protruding upper edge portion of the rear end panel rigidly mounted on a floor panel. The portion of the floor panel which is immediately below the frontwardly protruding upper edge portion of the floor panel has a cutout located intermediately of the width of the body structure. The cutout communicates with the interior of a tire pan which is secured to the floor panel from below. The tire pan has a shape generally conforming to one of the radial halves of the tire for receiving the tire in the pan.

The inner surface of the rear end panel of the luggage compartment includes a pair of spaced striker towers secured thereto on respective sides of the spare tire. The striker towers include upper ends on which respective releaseable locking devices are rigidly arranged for selectively securing and releasing associated strikers of a rear door to close and open the access opening leading to the luggage compartment.

BRIEF DESCRIPTION OF THE DRAWINGS

These and other objects and features of the present invention will become apparent from the following description when taken in conjunction with the preferred embodiments with reference to the accompanying drawings, in which.

DETAILED DESCRIPTION OF THE EMBODIMENTS

Figure 1:
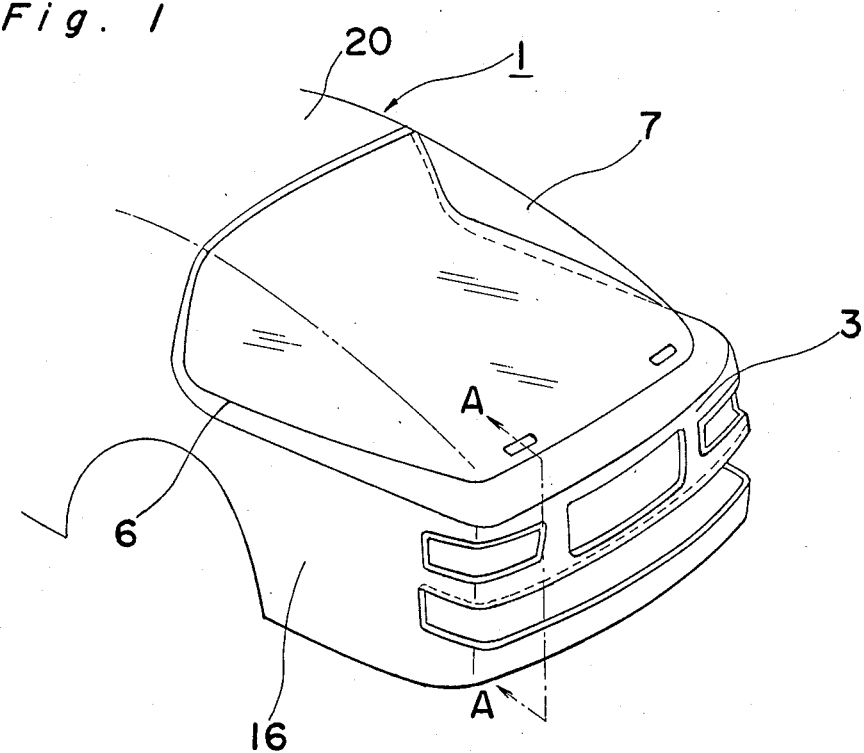
FIG. 1 is a perspective view of a rear end portion of an automobile body structure having a rear body structure to which the present invention is applied.
Figure 2:
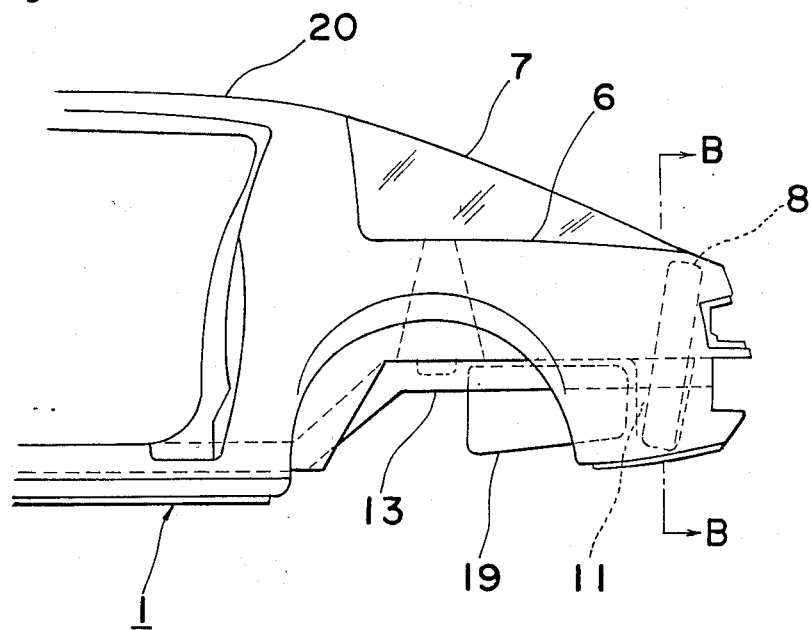
FIG. 2 is a side view of the rear body structure shown in FIG. 1.

Before the description of the present invention proceeds, it is to be noted that like parts are designated by like reference numerals throughout the accompanying drawings.

Referring first to FIGS. 1 to 5, a rear body structure, generally shown by 1, of an automotive vehicle has a luggage compartment 5 defined therein by a floor panel 2, a rear end panel 3 and a pair of opposed quarter panels 4. The luggage compartment 5 so defined in the rear body structure has an access opening 6 facing generally upwards and adapted to be selectively opened and closed by a rear door 7 hingedly connected to a rear edge portion of a roofing panel 20. The rear door 7 is depicted in the drawings as being made of a transparent material such as glass and serves as a combined lid and rear window. However, the rear door 7 may be in the form of a lid made of metal.

Figures 3, 6:
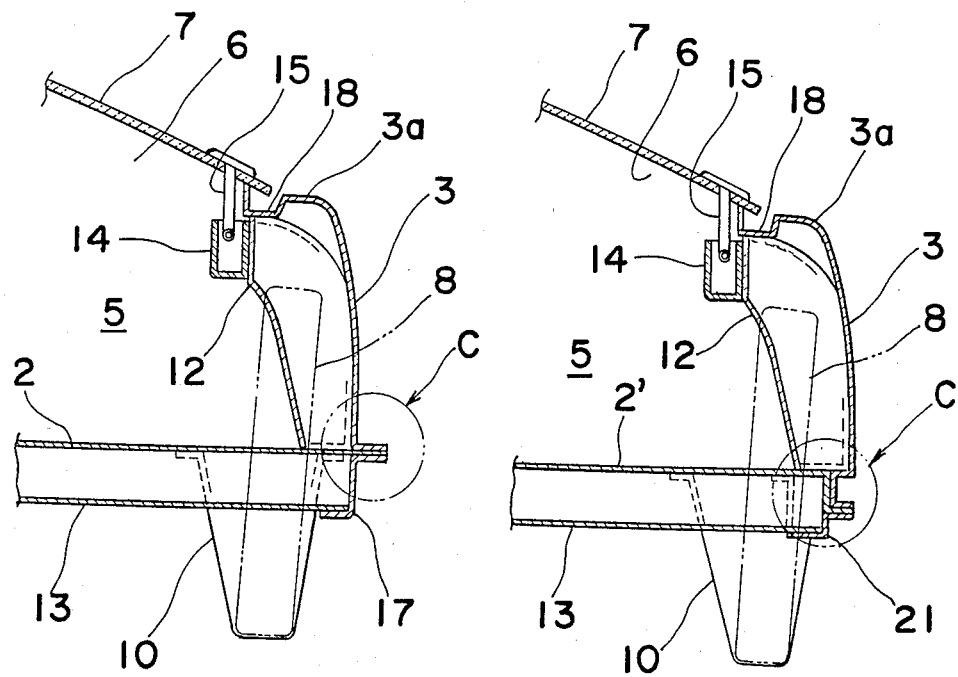
FIG. 3 is a cross-sectional view taken along the line A—A shown in FIG. 1.
FIG. 6 is a view similar to FIG. 3, illustrating another preferred embodiment of the present invention.
Figure 4:
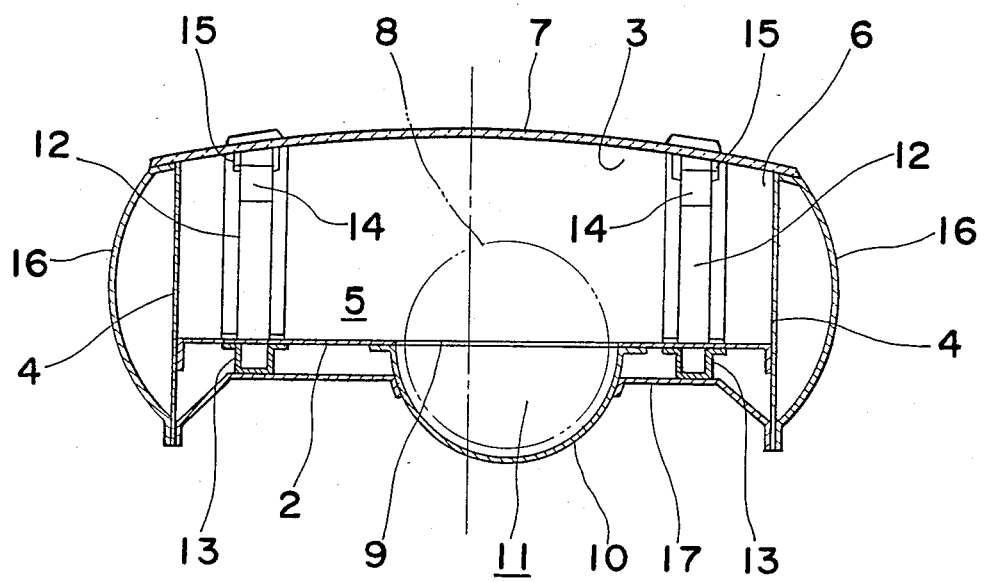
FIG 4 is a cross-sectional view taken along the line B—B shown in FIG. 2.
Figure 5:
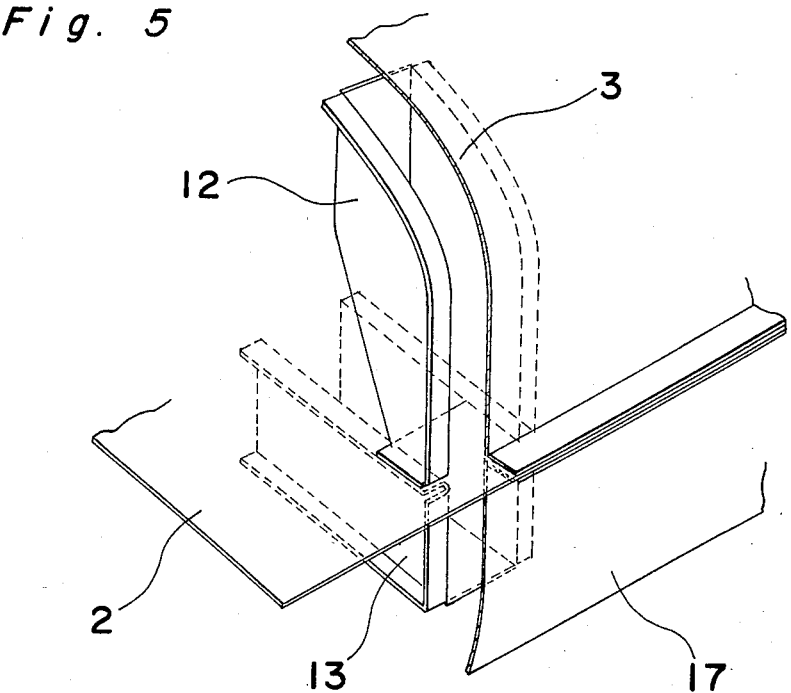
FIG. 5 is a perspective view, on an enlarged scale, depicting in greater detail the portion of the rear body structure enclosed within the circle C in FIG. 3.

As best shown in FIG. 3, the rear end panel 3 has its lower edge portion rigidly secured to the rear end of the floor panel 2 and its upper edge portion bent to protrude frontwardly towards the rear door 7 so as to define a rear lip region of the access opening 6. The frontwardly protruding upper edge portion 3a of the rear end panel 3 is so shaped and so positioned as to define, immediately therebelow and in the rearmost part of the luggage compartment 5, a space for accommodating a tire 8 in an upright position.

The floor panel 2 has a generally rectangular cutout 9 defined at a rear end portion thereof generally intermediately of the width of the rear body structure and at a position immediately below the frontwardly protruding upper edge portion 3a of the end panel 3. This cutout 9 has a length slightly greater than the outer diameter of the tire 8 so that the tire 8 can be received through the cutout 9 in a tire pan 10 rigidly secured from below to the floor panel 2, the tire pan 10 having a shape and a volume conforming generally to one of the radial halves of the tire 8. More specifically, the tire pan 10 is so shaped and so positioned as to permit the tire 8 to be received in the interior 11 thereof with the circumferential plane of said tire 8 lying perpendicular to the longitudinal axis of the automobile body structure as a whole. Although not shown, the tire 8 is supported with the radial half thereof seated within the interior 11 of the tire pan 10 so that the tire can be fixed in position by means of a suitable fastening means.

Secured rigidly to an inner surface of the rear end panel 3 confronting the luggage compartment and positioned on each lateral side of the tire 8 is a striker tower 12 of generally U-shaped cross-section extending generally perpendicularly to the floor panel 2. It is to be noted that each of the striker towers 12 on respective sides of the spare tire 8, when rigidly secured to the rear end panel 3, forms a cavity of generally closed cross-section. As shown in FIG. 3, an upper edge portion of the rear end panel includes a rain rail 18 through which rain can be drained. The striker towers 12 are rigidly secured to the rear end panel at the rain rail 18.

Each of the striker towers 12 is also rigidly secured at its lower end to a rear frame member 13 extending below the floor panel 2 in a direction generally parallel to the longitudinal axis of the vehicle body structure. While the lower ends of the respective striker towers 12 need not be always secured to the associated rear frame members 13 such as shown, but may be rigidly secured to a single cross member extending widthwise of the automobile body structure, the securement of the lower ends of the striker towers 12 to the rear frame members 13 is advantageous in that the rear body structure can be imparted with a rigidity because the cavity of generally closed cross-section defined by each striker tower 12 and the rear end panel 3, and that defined by each rear frame member 13 and the floor panel 2, are rendered contiguous to each other through the floor panel 2.

A releaseable locking device 14 of any known construction is mounted on an upper end of each of the striker towers 12. On the other hand, the rearmost edge portion of the rear door 7 has rigidly secured thereto a pari of spaced strikers 15 which, when and so long as the rear door 7 is in a closed position to close the access opening 6, are releaseably caught by the respective locking devices 14 to lock the rear door 7 in the closed position. Each of the strikers 15 may be of any known construction, for example, a hook type or a fork type.

In the construction so far described, the striker towers 12 serve not only to provide the rear end panel 3 with a sufficient rigidity in a direction perpendicular to the floor panel 2 and also in a direction longitudinally of the vehicle body structure, but also to provide a rigid support capable of accommodating impacts resulting from the rear door 7 being slammed to closed.

In FIGS. 1 to 5, reference numeral 16 represents a rear fender, reference numeral 17 represents a lower end panel, and reference numeral 19 represents a fuel tank.

From the foregoing, it has now become clear that the tire storage space is defined intermediately of the width of the body structure and at the rearmost part of the luggage compartment by means of the radially inwardly recessed tire pan secured to the floor panel from below, and the rear end panel which extends upwards from the rearmost end of the floor panel and frontwards to define the rear lip region of the access opening. Therefore, the tire 8 can be accommodated in the tire storage space occupying the rearmost part of the luggage compartment and can be supported in an upright position with the radial half thereof seated in the tire pan. This means that not only can a relatively large luggage compartment be available without substantially being disturbed by the spare tire, but also the removal and placement of the tire from and into the tire storage space, respectively, can readily be carried out.

Moreover, since the striker towers are secured to the rear end panel at the respective locations on both sides of the spare tire and extend vertically, the rear end panel can be imparted with a rigidity in the vertical direction generally perpendicular to the floor panel and also in the longitudinal direction of the vehicle body structure as a whole.

Furthermore, since the releaseable locking devices which are cooperable with the strikers of the rear door are rigidly supported by the striker towers, the striker towers effectively accommodate the impacts resulting from the rear door being slammed and, therefore, the fixing strength and the durability of the rear door can advantageously be improved.

Figure 7:
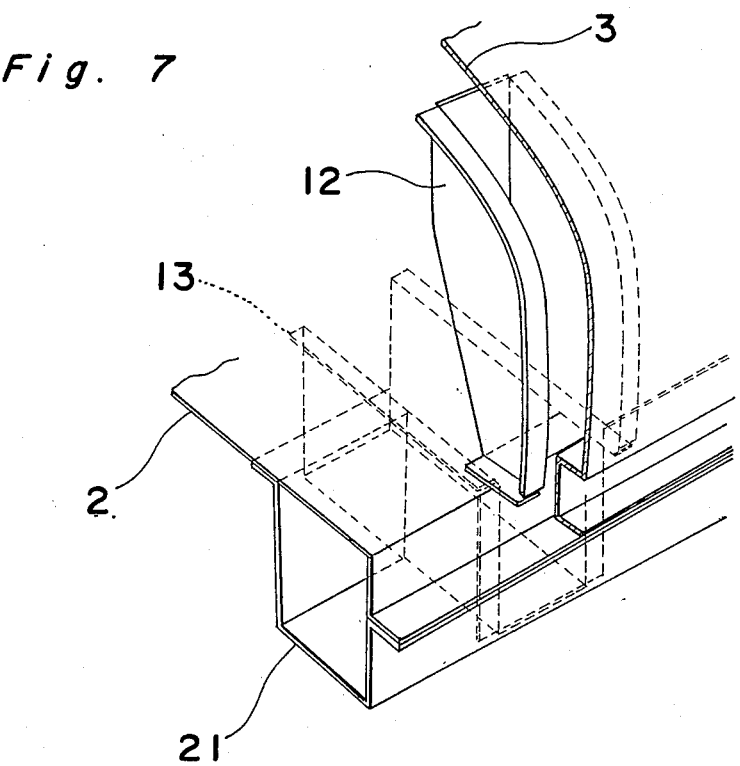
FIG. 7 is a view similar to FIG. 5, illustrating the portion of the rear body structure enclosed within the circle C in FIG. 6.

In the embodiment shown in FIGS. 6 and 7, the rear ends of the respective rear frame members 13 extend through a cross member 21 and are held in abutment with the rear end panel 3. The cross member 21 has a lengthwisely extending cavity of generally closed cross-section and extends from the rear of the vehicle body structure in a direction widthwise of the latter. The striker towers 12, which have been described as positioned immediately above the rear frame members 13 in the foregoing embodiment, are supported by both the respective rear frame members 13 and the cross member 21. Specifically, since the striker towers 12 are secured through the floor panel 2 to the rear ends of the corresponding rear frame members 13 which extend through the cross member 21 towards the rear end panel 3, the striker towers 12 can be concurrently used as structural elements of the automobile rear body structure.

It is to be noted that, even with the construction according to the embodiment shown in FIGS. 6 and 7, the same advantages as those afforded by the construction shown in FIGS. 1 to 5 can equally be appreciated.

Although the present invention has fully been described in connection with the preferred embodiments thereof with reference to the accompanying drawings, it is to be noted that various changes and modifications are apparent to those skilled in the art. Such changes and modifications are to be construed as being included within the scope of the present invention as defined by the appended claims.

I claim:

1. An automobile rear body structure comprising:
   a hingedly supported rear door for selectively closing and opening an access opening leading to a rear luggage compartment;
   a floor panel defining a floor of said luggage compartment;
   a rear end panel partially defining the luggage compartment and extending widthwise of the body structure, said rear end panel having a lower edge portion extending from a rear end of said floor panel and an upper edge portion angled so as to extend in a direction toward the rear door to define a rear lip region of the access opening;
   a transverse recess formed in the rear end of the floor panel at a location substantially intermediate of the width of the body structure for accommodating a tire in a substantially upright position, said transverse recess having a longitudinal axis substantially parallel to said rear end panel, said upper edge portion of the rear end panel extending over said tire located in the recess; and
   a striker tower positioned on each side of said tire, each of said striker towers having a lower portion secured to both the rear end panel and a rear frame member, said striker towers extending in a direction generally perpendicular to said floor panel and including an upper end connected to a rain rail formed by an upper edge portion of the rear end panel.

2. The automobile rear body structure of claim 1, further comprising a pair of spaced engagement elements rigidly secured to the rear door at respective locations adjacent the rear lip region of the access opening, and a pair of releasable locking members cooperable with the respective engagement elements for closing an opening the rear door, each of said locking members being mounted on an upper end of the respective striker tower.

3. The automobile rear body structure of claim 2, wherein a rear end portion of the floor panel generally intermediate of the width of the body structure is formed with a generally rectangular opening of a length greater than the outer diameter of the tire, and further comprising a tire pan having an interior defined therein in a shape corresponding to the shape of one of the radial halves of the tire, which tire pan is secured to the floor panel from below in alignment with the rectangular opening.

* * * * *